United States Patent [19]

Bhagwat et al.

[11] Patent Number: 4,905,300
[45] Date of Patent: Feb. 27, 1990

[54] MOTOR CONTROL AND POWER SYSTEMS AND METHODS OF OPERATION THEREOF

[75] Inventors: Pradeep M. Bhagwat; Richard T. Walter; Alan A. Gilmore, all of Baltimore, Md.

[73] Assignee: Black & Decker Inc., Newark, Del.

[21] Appl. No.: 52,760

[22] Filed: May 21, 1987

[51] Int. Cl.⁴ .............................................. H02P 5/402
[52] U.S. Cl. ................................. 388/800; 388/816; 388/817; 388/819; 307/80; 307/86
[58] Field of Search ............... 318/339, 342, 345 R, 318/345 A, 345 C, 345 CA, 345 CB, 345 AB, 345 D, 345 G, 345 H; 307/43, 44, 80, 81, 86; 388/800, 816, 817

[56] References Cited

U.S. PATENT DOCUMENTS

| Re. 25,203 | 7/1962 | Momberg et al. | 318/246 |
|---|---|---|---|
| 2,357,418 | 9/1944 | Mattheyses | 363/126 |
| 2,912,632 | 11/1959 | Turtil | 318/261 |
| 3,095,514 | 6/1963 | Custer et al. | 307/150 |
| 3,176,212 | 3/1965 | De Puy | 363/86 |
| 3,189,788 | 6/1965 | Cady | 307/86 X |
| 3,191,112 | 6/1965 | Cain | 318/246 |
| 3,242,410 | 3/1966 | Cockrell | 318/331 |
| 3,278,821 | 10/1966 | Gutzwiller | 318/331 |
| 3,297,931 | 1/1967 | Gurwicz | 318/380 |
| 3,336,490 | 8/1967 | Yelpo et al. | 310/50 |
| 3,355,650 | 11/1967 | Tolmie | 318/342 |
| 3,411,062 | 11/1968 | Kamens | 318/331 |
| 3,414,802 | 12/1968 | Harrigan et al. | 307/44 X |
| 3,461,371 | 8/1969 | Klayman et al. | 318/332 |
| 3,508,134 | 4/1970 | Dosch et al. | 318/331 |
| 3,548,276 | 12/1970 | Gross | 318/245 |
| 3,564,372 | 2/1971 | Vogelsberg et al. | 318/434 |
| 3,588,653 | 6/1971 | Corrigall | 318/331 |
| 3,652,919 | 3/1972 | Harrigan | 307/43 X |
| 3,783,361 | 1/1974 | Mason | 318/331 |
| 3,800,202 | 3/1974 | Oswald | 318/302 |
| 3,886,438 | 5/1975 | Bouman | 307/44 X |
| 3,926,264 | 12/1975 | Bardwell et al. | 318/434 X |
| 4,074,175 | 2/1978 | Born et al. | 318/332 |
| 4,144,482 | 3/1979 | Schwab | 318/381 |
| 4,181,876 | 1/1980 | Kato et al. | 318/345 G |
| 4,246,521 | 1/1981 | Soeda et al. | 318/331 |
| 4,250,436 | 2/1981 | Weissman | 318/245 |
| 4,284,930 | 8/1981 | Matty | 318/269 |
| 4,303,874 | 12/1981 | Iwai | 318/331 |
| 4,390,823 | 6/1983 | Brown et al. | 318/331 |
| 4,390,824 | 6/1983 | Brown | 318/331 |
| 4,394,606 | 7/1983 | Woerwag | 318/434 |
| 4,453,115 | 6/1984 | Yoshida | 318/434 |
| 4,473,784 | 9/1984 | Morez | 318/439 |
| 4,504,769 | 3/1985 | Fushiya et al. | 318/345 H |
| 4,532,567 | 7/1985 | Kade | 361/31 |
| 4,543,522 | 9/1985 | Moreau | 307/44 X |
| 4,546,305 | 10/1985 | Goddijn | 323/299 |
| 4,560,887 | 12/1985 | Schneider | 307/86 X |
| 4,588,900 | 5/1986 | Honjo | 307/44 X |
| 4,609,828 | 9/1986 | Small | 307/44 |
| 4,644,229 | 2/1987 | Masaki | 361/51 X |
| 4,720,641 | 1/1988 | Faini | 307/43 X |

FOREIGN PATENT DOCUMENTS

| 0848551 | 8/1970 | Canada . | |
|---|---|---|---|
| 0888943 | 12/1971 | Canada . | |
| 0890010 | 1/1972 | Canada . | |
| 1050609 | 3/1979 | Canada . | |
| 1153450 | 8/1963 | Fed. Rep. of Germany | 318/345 R |
| 3118737 | 2/1982 | Fed. Rep. of Germany | 318/345 R |
| 55-66297 | 5/1980 | Japan | 318/342 |

OTHER PUBLICATIONS

"Model Train Controller", Practical Electronics, vol. 17, No. 1, Jan. 1981.

Primary Examiner—Bentsu Ro
Attorney, Agent, or Firm—J. Bruce Hoofnagle

[57] ABSTRACT

A pulsating D.C. voltage is developed by a rectifier 86 and is filtered by a capacitor 100 to facilitate application of a relatively smooth, enhanced D.C. voltage to a motor 106.

The charged voltage of capacitor 100 is applied across a series circuit which includes a rheostat 118, a resistor 126 and motor 106. When the CEMF of motor 106 drops as a result of a decrease in motor speed, a disc 122 is biased through the voltage appearing across rheostat 118 and resistor 126 to cause an SCR 116 to fire. When SCR 116 fires, the voltage of capacitor 100 supplies a boost of power to motor 106 to overcome the decrease in motor speed.

A circuit 212 prevents an overspeed of motor 106 from occurring while braking circuits 264, 266 and 268 provide for a dynamic braking effect when the motor is a universal motor.

27 Claims, 7 Drawing Sheets

MOTOR CONTROL AND POWER SYSTEMS AND METHODS OF OPERATION THEREOF

BACKGROUND OF THE INVENTION

This invention relates to motor control and power systems. In particular, this invention relates to systems for providing substantial and enhanced power for the operation of motors in power-operated devices during load conditions and for providing boosts of additional power upon demand during load conditions. In addition, this invention further relates to systems for protecting such motors during overspeed conditions and for selectively applying dynamic braking upon shut down of motor operation. Also, this invention relates to methods of operating the power systems.

A universal motor includes a field winding or coil which is connected in series with a rotatable armature winding and can operate from either an A.C. or D.C. input. A permanent magnet motor, which is referred to as a PM motor, includes a rotatable armature winding and utilizes a permanent magnet to provide the magnetic field which is provided by the field coil in the universal motor. The PM motor also can operate from either a rectified A.C. or a D.C. input and functions similarly to a series motor. Both the universal and PM motors have excellent starting torque but experience drops in speed as the driven load increases which necessitates additional current from the power source.

Currently, universal and PM motors are used in a variety of power-operated devices such as, but not limited to, household and kitchen products, power tools and outdoor lawn and garden equipment. Typically, such power-operated devices include internally of the device a universal or PM motor which is powered by a conventional A.C. source. In some instances, the A.C. voltage of the source is rectified by a rectifier which is contained within the device to facilitate the application of a pulsating D.C. voltage to the motor. Since the D.C. voltage is pulsating at twice the frequency of the conventional A.C. source, torque pulsations occur at the same frequency and are mechanically transmitted throughout the motor which results in undesirable noise and vibration.

In addition, because the D.C. voltage is pulsating, the average D.C. voltage effectively applied to the motor is limited and thereby limits the effective power output and the speed of the motor. Also, since losses in the motor are proportional to the effective value (RMS) of the current, substantial losses are generated in the motor at heavy loads to deliver the required load. One way of increasing the power capability of the power-operated device is to increase the size of the motor to increase the cooling capability. However, this results in a heavier device and detracts from the portability and maneuverability of the device.

Thus, there is a need for a power-operated device which can improve the power output and speed capability of a motor of the device while not detracting from the portability of the device.

Frequently, a power-operated device which uses a universal or a PM motor encounters a load change which affects the speed of the motor. For example, a lawn mower which uses a universal or PM motor may be operating in an unloaded condition and then is moved into a normal grass cutting mode where the blades of the mower encounter load conditions such as a moderate height of grass. This results in a reduction of the speed of the motor. When the blades of the lawn mower encounter additional load conditions such as higher heights of grass, a significantly increased load is placed on the motor whereby the motor speed decreases further. During these periods of reduced speed, the motor is operating inefficiently and, if the additional load conditions continue, the mower may not recover and eventually will stall.

Several known motor control systems employ the principle of detecting changes in the counter EMF (CEMF) of the motor to indicate changes in the speed of the motor which typically result from changes in the motor load. In many of these systems, a silicon-controlled rectifier (SCR) is connected in series with the armature. The CEMF fluctuations are used directly or indirectly to control the firing angle of the SCR and, thereby, control the period of connecting the armature to line voltage. In such systems, the SCR functions as a rectifier and, typically, is conducting for less than a half of each full cycle of power source operation. Since the SCR conducts for less than a half cycle, the power delivered to the motor is comparatively low. At least one other system employs two SCR's to control the flow of current alternately in both directions through the motor with one SCR controlling low-to-medium speeds and the other SCR controlling medium-to-high speeds of the motor. Even so, operating power is applied to the motor during less than a full cycle of each cycle of operation of the power source. Examples of both of the foregoing systems are illustrated in U.S. Pat. No. 4,181,876 which issued on Jan. 1, 1980.

In any event, the above-noted SCR systems control the supply of current directly from the line as a means of speed control. These systems do not provide a sustained application of operating power to the motor with a power boost from a second source if needed when the motor is subjected to load conditions.

In another system which is illustrated in U.S. Pat. No. 3,588,653 which issued on June 28, 1971, the firing angle of an SCR, which is connected in series with the motor, is controlled independently of the motor CEMF to furnish power from a primary power source to the motor during appropriate periods. A capacitor is connected in parallel with the motor and is charged during conduction of the SCR and furnishes power to the motor when the SCR is not conducting. The system illustrated in U.S. Pat. No. 3,588,653 furnishes power from the primary source to the motor during periods when the SCR is conducting and furnishes power from the capacitor to the motor at times when the SCR is not conducting. Therefore, the system does not respond to load conditions wherein the motor requires a boost of power to overcome the apparent inability of the motor to handle such load conditions.

Thus, there is a need for a motor control and power system which not only furnishes power continuously from a primary power source to a motor but also furnishes a boost of power to the motor independently of the primary power source during periods when the motor is subjected to load conditions.

Some motor control systems employ various types of switching elements in the control of motor speed. If any of these elements fail such as by shorting, the motor could enter an overspeed mode culminating in damage to or destruction of the motor and any surrounding equipment.

Thus there is a need for a system which responds to such element failures and not only prevents the motor from entering an overspeed mode but also promptly brakes the motor.

In the use of universal motors, it is common practice at the time of braking the motor to reverse the connection of the field coil with the armature and to connect the coil and the armature, and optionally a braking resistor, in a series loop to provide a dynamic braking effect. This principle of dynamic braking is described as prior art in U.S. Pat. No. 4,144,482 which issued on Mar. 13, 1979.

When an A.C. line voltage is used as the direct power source for the motor, the voltage waveform passes through a zero level and then proceeds in the opposite direction. As the voltage waveform passes through the zero level, there is no current through the field coil to develop a field. However, there is sufficient residual magnetism in the field core to establish a field of low level flux. As the voltage waveform moves away from the zero level, a field in the opposite direction is developed which is expended to overcome the flux resulting from the residual magnetism. At that time, there is no field through which the armature can rotate and, hence, the field is at a zero flux level. This condition does not interfere with the normal operation of the motor. However, if a brake switch is closed at the time the field is at the zero flux level, dynamic braking will not occur because the armature must be rotating through a field of some flux in order to effect such braking.

Thus, there is a need for a dynamic braking circuit which overcomes the disadvantage of the zero flux effect noted above to insure that dynamic braking is available when needed. Also, there is a need for simple but unique braking circuits which quickly and effectively brake a motor in dynamic fashion.

In summary, there is a need for a power system which can provide, upon demand, a boost of additional power to a power-operated device when the device encounters load conditions. Further, there is a need for a power system which includes facility for preventing overspeed of the motor due to internal failings within the power system and also for providing dynamic braking of universal motors used with such power-operated devices.

SUMMARY OF THE INVENTION

This invention contemplates a system which includes means for continuously supplying power to a motor and means responsive to a demand from the motor for supplying additional power to the motor independently of and simultaneously with the supply of power by the first means.

Further, this invention contemplates a motor control circuit which includes means for controlling the supply of power to a motor. Means are provided for developing a voltage across the controlling means when the controlling means is not operational. A means, which is responsive to the absence of voltage across the controlling means during a prescribed period, removes the supply of all power to the motor.

Also, this invention contemplates a control circuit for a universal motor which includes a field coil and an armature connected in series. Means are provided for developing pulsating D.C. voltage which is filtered and applied to the motor. Another means reverse connects the field coil and armature in a closed series loop to effect dynamic braking of the motor at the time the motor is shut down.

DETAILED DESCRIPTION

Figure 1:
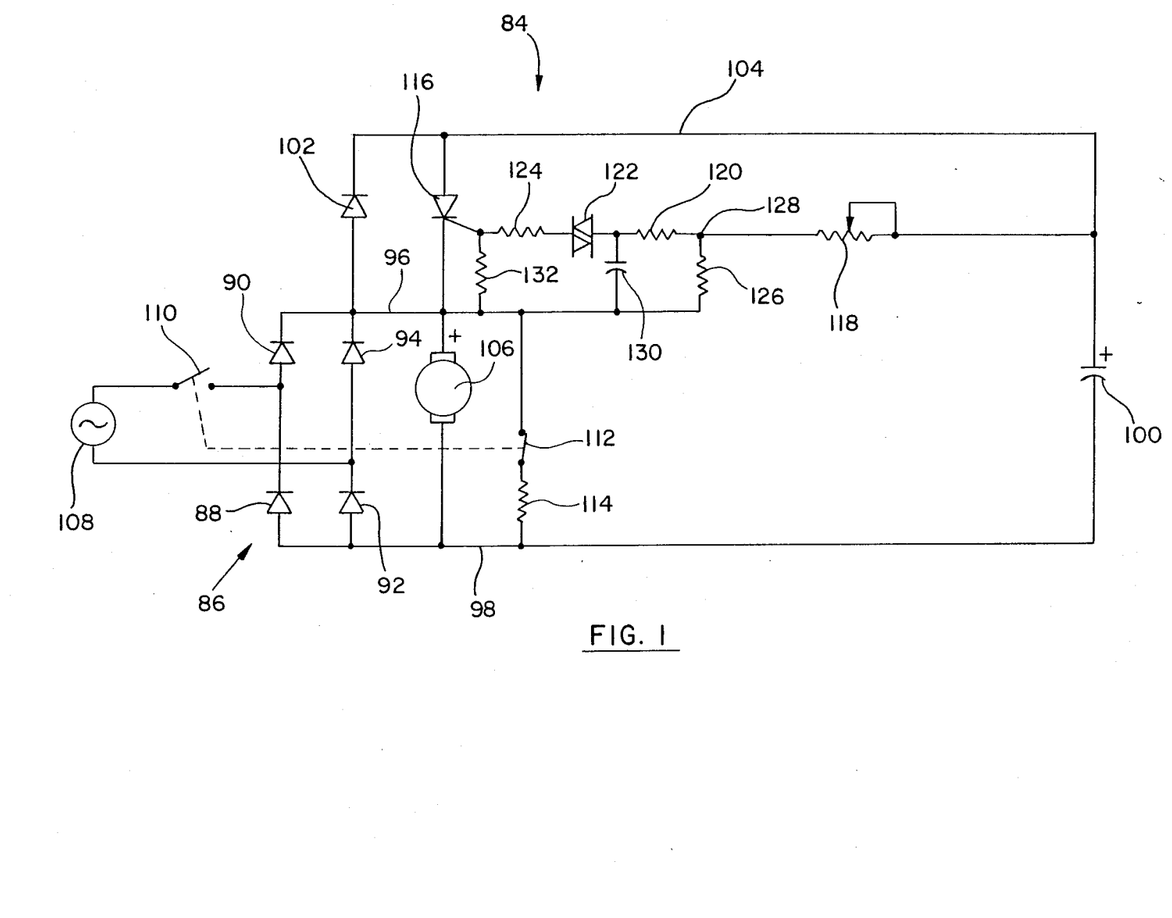
FIG. 1 is a schematic of a power boost circuit which provides a boost of power to a permanent magnet motor upon demand and embodies certain principles of the invention.

Frequently, as a power-operated device begins to encounter load conditions, a reduction in the speed of the motor of such a device occurs whereby deleterious effects resulting from the load conditions are further compounded. As illustrated in FIG. 1, a power boost circuit 84 has been developed to respond to the load conditions and provide a boost of power to the power-operated device to maintain the speed of the motor sufficiently for operation of the device.

Power boost circuit 84, which is the preferred embodiment of the invention, includes a full wave rectifier 86, formed by diodes 88, 90, 92 and 94, for supplying a pulsating D.C. voltage between output lines 96 and 98. The output of rectifier 86 is applied to an electrolytic capacitor 100 through a diode 102 which is connected to the capacitor by line 104.

An A.C. source 108, which provides, for example, conventional household voltage of 120 volts at a frequency of 60 Hz., is connected through a switch 110 to the input of the rectifier 86 in a conventional manner. Switch 110 is mechanically coupled to switch 112 which is connected in series with a braking resistor 114. Switch 112 and braking resistor 114 are connected across motor 106. Switches 110 and 112 are alternately arranged so that switch 110 is open when switch 112 is closed and vice-versa. When switch 110 is closed to operate motor 106, switch 112 is opened to disconnect resistor 114 from circuit 84. When switch 110 is opened to remove operating power from motor 106, switch 112 is closed to connect resistor 114 across motor 106. Resistor 114 then functions in the typical manner of a braking resistor to quickly brake motor 106.

Power boost circuit 84 further includes a silicon-controlled rectifier (SCR) 116 which is connected between lines 96 and 104 but which is reverse biased with respect to diode 102. It is noted that a triac (not shown) with appropriate control circuitry could be connected in power boost circuit 84 in place of, and to function in the same manner as, diode 102 and SCR 116 without departing from the spirit and scope of the invention.

One side of a rheostat 118 is connected to line 104 and is further connected in series with a resistor 120, a diac 122 and a resistor 124 which, in turn, is connected to the gate of SCR 116. A resistor 126 is connected between line 96 and a juncture 128 between rheostat 118 and resistor 120. A capacitor 130 is connected between line 96 and a juncture between resistor 120 and diac 122. A resistor 132 is connected between the gate of SCR 116 and line 96 whereby the resistor is effectively connected between the gate and cathode of the SCR.

In the operation of power boost circuit 84, switch 110 is closed thereby opening switch 112. A.C. voltage is applied to rectifier 86 which develops a pulsating D.C. voltage having a peak value of approximately 170 volts. The output of rectifier 86 biases diode 102 into conduction whereby the rectifier output is applied to capacitor 100 which quickly charges to the peak voltage, or 170 volts, of the rectifier output. In addition, the unfiltered average D.C. voltage, about 109 volts, of rectifier 86 is applied to motor 106 to operate the motor. This condition remains stable whereby capacitor 100 remains fully charged and motor 106 is operating at a steady speed.

During this stable period, motor 106 is developing a back or counter EMF (CEMF) which is the result of the generator action developed normally by the armature conductors rotating through the magnetic field of the magnet when a PM motor is used or of the series-connected field coil when a universal motor is used. Rheostat 118, resistor 126 and motor 106 are connected in a series circuit which is in parallel with capacitor 100 whereby the voltage of the capacitor is applied across the series circuit. A portion of the voltage of capacitor 100 is dropped across motor 106 to countermand the CEMF of the motor thereby leaving the remaining voltage to be dropped across rheostat 118 and resistor 126. Also during this stable period, diac 122 is biased off thereby biasing the gate of SCR 116 so that the SCR is non-conductive. Further, capacitor 130 will charge to a predetermined level through resistor 120.

During operation of power boost circuit 84, a voltage appears at juncture 128 by virtue of the voltage of capacitor 100 being dropped across rheostat 118, resistor 126 and motor 106. The voltage appearing at juncture 128 is coupled through resistor 120 to diac 122. However, when motor 106 is operating under no load or very light load conditions, the CEMF is high and the voltage appearing at juncture 128 is too low to bias diac 122 into conduction.

When motor 106 experiences a load condition, the motor speed drops thereby reducing the generator effect so that the CEMF drops. Thus, less of the voltage is required to countermand the lowered CEMF thereby increasing the drop across rheostat 118 and resistor 126. With this increase in voltage drop, a larger voltage now appears at juncture 128 whereby diac 122 fires and opens a current path to the gate of SCR 116. As diac 122 fires, capacitor 130 begins to discharge through the diac and resistor 124 to the gate of SCR 116. Eventually, sufficient current is dumped into the gate of SCR 116 to turn on the SCR. As soon as SCR 116 is fired, the voltage of capacitor 100 is applied directly across motor 106 to provide a power boost to the motor. In this manner, capacitor 100 effectively filters the pulsating D.C. voltage of rectifier 86 to increase the average D.C. voltage applied to motor 106 to a level of approximately 150 volts. It is noted that the voltage applied to motor 106 in FIG. 1 follows the heavy-lined-waveform 133 illustrated between voltages V1 and V2 in FIG. 6.

With additional power applied to motor 106 by the filtering action of capacitor 100, the motor speed is stabilized to the extent that the motor is now capable of responding to any further load conditions and will not experience a downward spiral in speed levels which could result in stalling.

It is noted that rheostat 118 represents any form of adjustable resistance which can be set at the factory to establish the voltage level at juncture 128 at which diac 122 will fire. Further, resistor 132 is a large valued resistor which ties the gate of SCR 116 to the cathode to prevent spurious signals and extraneous noise from incidentally firing the SCR and otherwise influencing operation of circuit 84.

Figure 2:
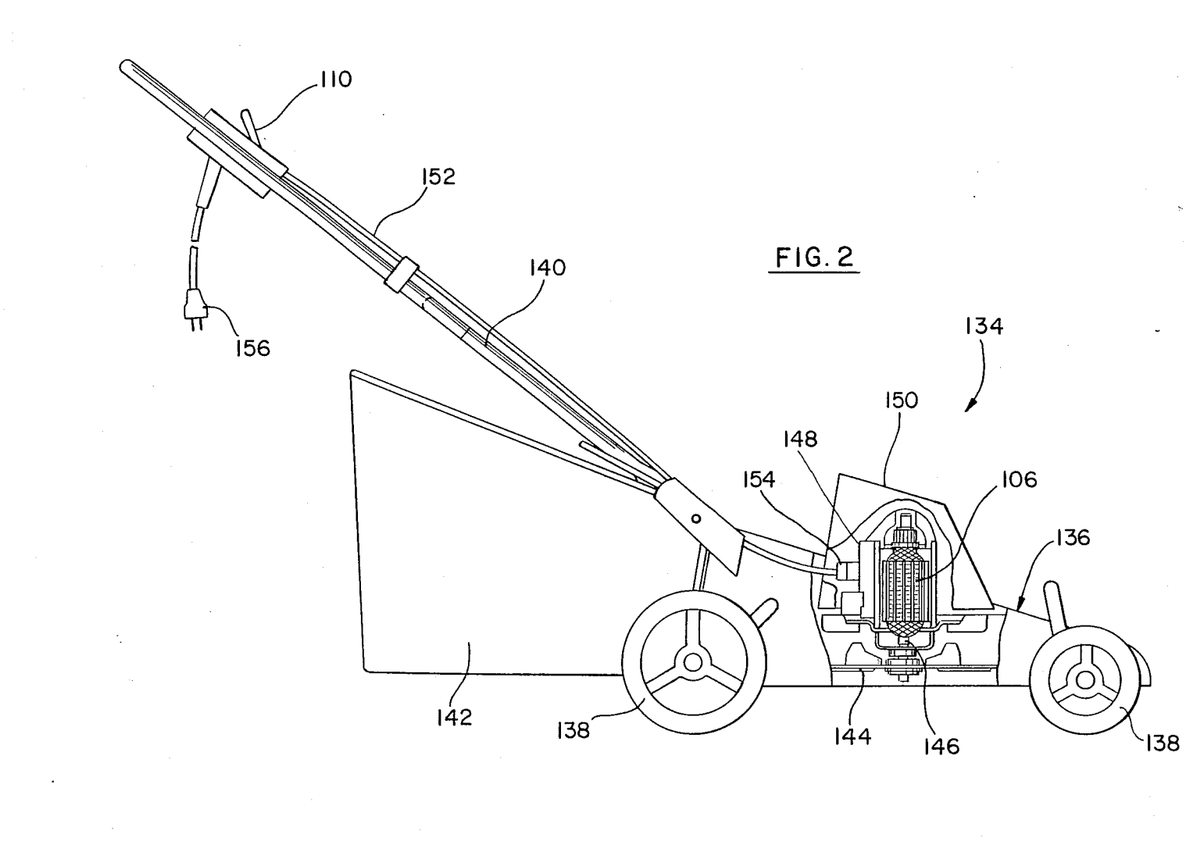
FIG. 2 is a side view of a lawn mower which includes in-board thereof the power boost circuit of FIG. 1.

Power boost circuit 84 can be used to power a variety of power-operated devices such as, but not limited to, household and kitchen products, power tools and outdoor lawn and garden equipment. For example, a lawn mower 134, as illustrated in FIG 2, has been developed which operates under the control of power boost circuit 84. Lawn mower 134 includes a housing 136, four wheels 138 (two shown) mounted for rotation on the housing, motor 106 (FIG. 1) mounted on the housing, a handle 140 and a grass catcher 142. A blade 144 is secured to a drive shaft 146 which extends axially from motor 106. A power boost module 148 is mounted adjacent motor 106 and includes a circuit board for supporting power boost circuit 84 (FIG. 1). A shroud 150 is positioned over motor 106 and module 148 to protect and shield the motor and module. An electrical cord 152 is secured to handle 140 and has a modular plug 154 connected to one end of the cord and a conventional A.C. plug 156 connected to the other end of the cord. Plug 154 is connected to module 148. Switch 110 (FIG. 1) is electrically connected in cord 152 to facilitate operation of power boost circuit 84, motor 106 and mower 134 upon closure of the switch. It is noted that, while switch 110 is illustrated as a lever or toggle type switch in FIG. 2, any type of switch suitable for this use will be considered appropriate.

When using mower 134, the operator connects plug 156 into an outlet which supplies the necessary A.C. voltage. Switch 110 is then turned on to apply A.C. voltage to module 148 through cord 152 and plug 154. Power boost circuit 84 then functions as described above with respect to the circuit illustration of FIG. 1. During no-load conditions, motor 106 operates in the manner of a small motor and draws a relatively small amount of current from the supply line. Further, the speed of motor 106 is comparatively high. When mower 134 is moved from an unloaded condition through grass of moderate height to cut the grass to a desired lower height, motor 106 experiences a load condition whereby the motor speed drops to a level which is sufficient to maintain the cutting action necessary to cut the grass. With a drop in speed and an increase in the load, the required torque increases as well as the current drawn from the A.C. source. At this time, power boost circuit 84 (FIG. 1) functions as described above to fire SCR 116. As SCR 116 fires, a boost of power is provided by capacitor 100 to assist the A.C. source 108 during the load condition by providing the necessary energy to sustain the speed of motor 106 in cutting the grass.

When mower 134 is directed into much taller grass, motor 106 suddenly experiences increased load conditions whereby the speed of the motor tends to decrease further. Power boost circuit 84 continues to function during the period of increased load conditions where a power boost continues to be applied to motor 106 by capacitor 100.

Comparative laboratory brake tests have been conducted using two electric motor-driven mowers to illustrate the operational significance of the invention embodied in power boost circuit 84 and in the use of the circuit with a power-operated device such as, for example, a lawn mower. The two mowers will hereinafter be identified as mowers "A" and "B." Mower "A" is manufactured and marketed by Black & Decker (U.S.) Inc. and is identified as model 8018. Mower "B" differs from mower "A" only by the addition of power boost circuit 84. Otherwise mowers "A" and "B" are identical.

In order to appreciate the significance of the comparative test results, it is to be understood that a lawn mower with an 18 inch blade rotating at speeds above 2700 RPM generally will cut all of the grass placed in its path. As the blade speed begins to drop below 2700 RPM, the blade pushes aside and does not cut some of the grass. Gradually, as the speed continues to drop well below 2700 RPM, less grass is cut by the rotating blade and, at very low speeds, essentially no grass is cut. Generally, this speed-reduction reaction usually occurs when the mower initially encounters a load condition resulting from grass of a moderate height and continues as the mower engages taller grass which places an increasing load on the mower whereby the mower eventually may stall. In any event, the speed level of 2700 RPM appears to be the level below which grass cutting efficiency drops significantly.

In conducting the tests, various levels of a brake load were applied to each mower representative of the mower encountering various heights of grass.

Figure 3:
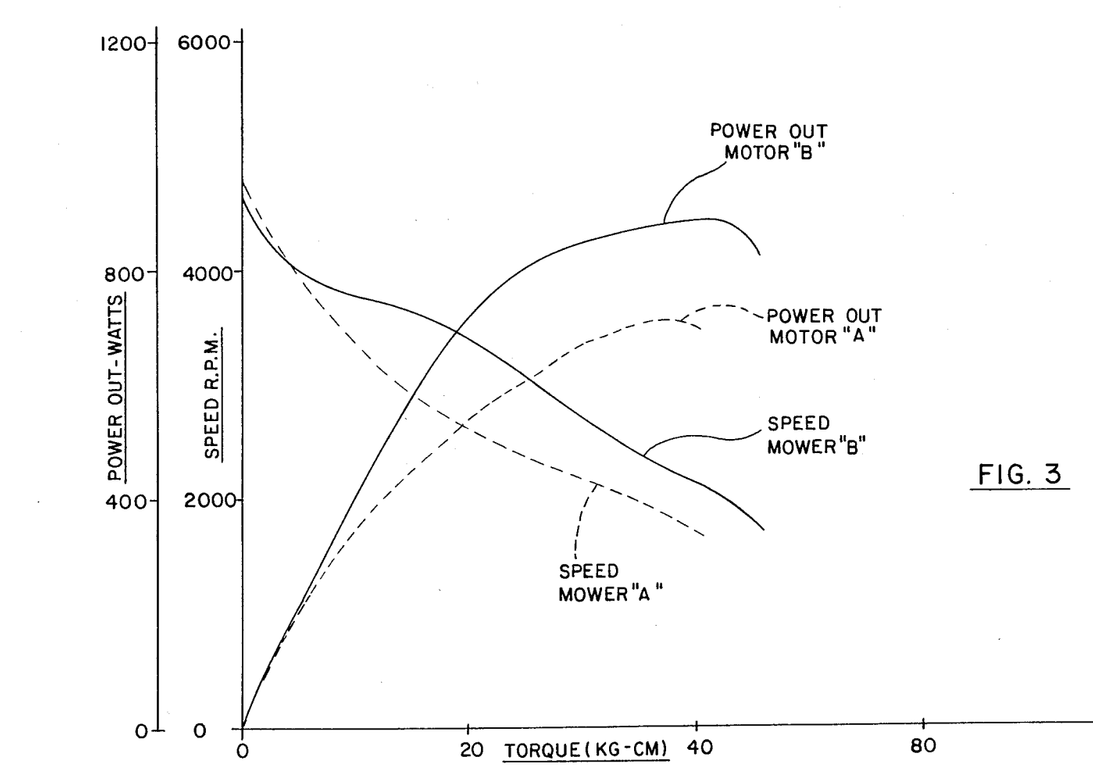
FIG. 3 is a graph which illustrates speed and power output results of comparative testing of two lawn mowers, one of which included the power boost circuit of FIG. 1.

Referring to FIG. 3, a graph illustrates the comparative differences in motor speed (RPM) under increasing load, as represented by torque measured in kilogram-centimeters (kg.-cm.), and the power output in watts of the mowers tested. Specifically, the speed and power output curves of mower "A" are shown by dashed lines and the curves of mower "B" are shown by solid lines.

As depicted in FIG. 3, the speed of motor "A" is relatively high at no-load or very light-load conditions but decreases at a steady rate as the load increases. Mower "A" reaches the speed level of 2700 RPM at a load represented by a torque of approximately 20 kg.-cm. Thus for loads beyond these torque levels, the cutting efficiency of mower "A" drops significantly.

With regard to mower "B," the speed curve shows that the speed at no-load or very light-load conditions is high and begins to decrease in the manner of motor "A." However, at a speed level just below 4000 RPM, the rate of decrease slows significantly to the extent that a knee is formed in the curve. This represents the condition wherein motor 106 of mower "B" has encountered a load condition and SCR 116 has fired to supply current from capacitor 100 to the motor to provide a boost of power. Thus, the boost of power extended the capability of mower "B" to handle increasing loads well beyond the range of mower "A." For example, mower "A" dropped to the speed level of 2700 RPM at a load represented at a torque level of 18 kg.-cm. As illustrated on the graph of FIG. 3, mower "B" does not drop to the speed of 2700 RPM until the mower encounters a load represented at a torque level of 30 kg.-cm.

Therefore, power boost circuit 84 increases the ability of mower "B," or mower 134 (FIG. 2), to perform and handle significantly larger loads than mower "A."

Referring further to FIG. 3, the power output as measured in watts also reveals that mower "B" provides significantly more power than does mower "A," particularly in the operating range of the mowers. Generally, the power curve of mower "A" follows the same path with a slight departure at higher load conditions. However, the power curve of mower "B" begins to increase at a more rapid pace at low load levels and exceeds the power levels of motor "A" well beyond the load levels which are considered significantly high. This indicates that motor "B" provides significantly higher levels of power out than motor "A" for load levels as high as approximately 40 kg.-cm.

Thus, the curves of FIG. 3 reveal that motor "B" with the power boost of circuit 84 is capable of maintaining high speed levels and high power output for further load conditions well beyond the capabilities of mower "A."

It is noted that, while the power out of each of mowers "A" and "B" peaks at a point when the speed of the mowers is well below the lower effective cutting rate of 2700 RPM, it still demonstrates the effectiveness of power boost circuit 84 which provided a significantly high power output in a heavily loaded condition. This feature is extremely valuable when power boost circuit 84 is used with other types of power-operated devices that are used in an environment different from that of a lawn mower.

Some commercially available electric lawn mowers which use blades having diameters of 19 and 20 inches require a large motor so that when additional power is needed during loaded conditions, it is available. However, this means that such mowers must be supplied with large amounts of current during no-load or light load conditions to operate the large motors. To prevent such mowers from operating at unsafe speeds during the no-load or light load conditions, the blades are twisted significantly to place a drag on the motor. Thus, as the blades are driven during a no-load condition, the twisted portions of the blade meet with a relative wind resistance which prevents the speeds from increasing beyond a safe level. Still the motor draws significant levels of current from the A.C. source to overcome the drag resulting from the twisted portions of the blades. When the higher-level loads are encountered, even greater levels of current are drawn by the motor which increases the expense of operation significantly. With the availability of power boost circuit 84, there is no need to overpower mower "B" during a no-load condition to insure that adequate power is available during normal and above-normal load conditions. Thus, motor 106 can function as a small motor during no-load or light load conditions and thereby draw relatively low levels of current. For example, during no-load or light load conditions of the comparative tests, mower "B" drew about 2 to 3 amps. When a power boost occurs through circuit 84, motor 106 can operate as a large motor and perform accordingly. Also, there is no need to form significant twists in the blades of mower "B" because motor 106 does not require a large drag during no-load or light load operation. If desired, a slight twist can be formed in the blades to assist in lifting the cut grass into grass catcher 142.

In this manner, the bulk of the energy supplied to mower "B" is used in cutting grass rather than overcoming any drag developed by blades with large twists formed therein.

Figure 4:
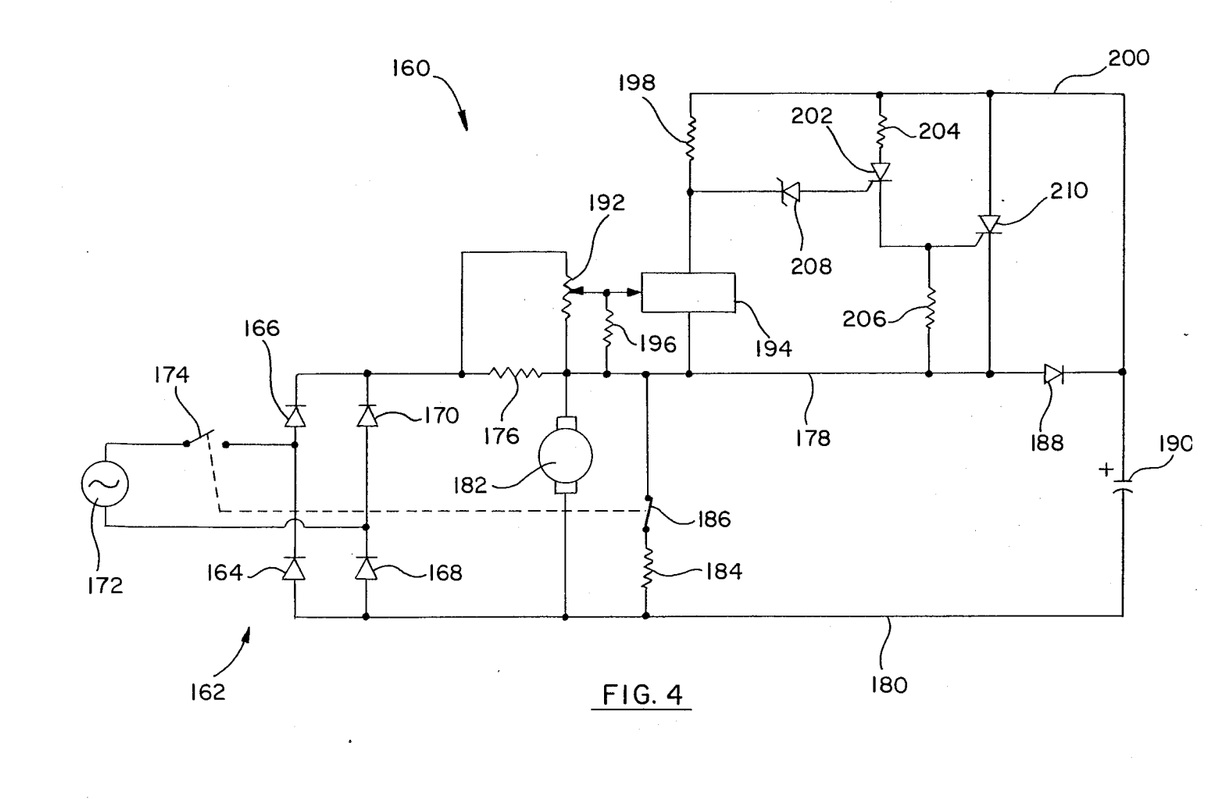
FIG. 4 is a schematic of a power boost circuit which provides a boost of power to a universal motor upon demand and embodies certain principles of the invention.

While circuit 84 is the preferred embodiment of the invention and is functionally described for use with a PM motor, the principle embodied in the circuit also may be used with other types of motors. For example, a power boost circuit 160, as illustrated in FIG. 4, is functional with a variety of types of motors without departing from the spirit and scope of the invention. These types of motors include, but are not limited to, PM motors, universal motors, shunt motors and compound motors.

Referring further to FIG. 4, power boost circuit 160 includes a rectifier 162 formed by diodes 164, 166, 168 and 170. An A.C. voltage source 172 is coupled through an on-off switch 174 to rectifier 162 Whereby the A.C. Voltage is rectified to develop a pulsating D.C. voltage. The pulsating D.C. voltage is coupled through a current sensing resistor 176 and is applied between lines 178 and 180 to a universal motor 182. A braking resistor 184 and a normally-closed switch 186 are connected across motor 182. Switch 186 is mechanically connected to switch 174 so that, when switch 174 is opened to shut down motor 182, switch 186 is closed to apply dynamic braking to the motor. In addition, the pulsating D.C. voltage is applied through a diode 188 to charge an electrolytic capacitor 190.

A potentiometer 192 is connected in parallel with resistor 176 with the tap arm thereof connected to the input of a voltage sensitive device 194. Voltage sensitive device 194 is of the type which is available from National Semiconductor Corporation of Santa Clara, Calif. as model No. LM334. A resistor 196 is connected between the tap arm of potentiometer 192 and line 178. One side of device 194 also is connected to line 178 while the output side of the device is connected through a resistor 198 through a line 200 to capacitor 190. The anode of a silicon-controlled rectifier (SCR) 202 is connected through a resistor 204 to line 200 while the cathode of the SCR is connected through a resistor 206 to line 178. The anode of a Zener diode 208 is connected to the gate of SCR 202 and the cathode of the Zener diode is connected to the output side of device 194. The anode of another silicon-controlled rectifier (SCR) 210 is connected to line 200, the cathode of the SCR is connected to line 178 and the gate electrode of the SCR is connected through resistor 206 to line 178.

During all periods of motor operation, the current which flows through motor 182 also flows through resistor 176 whereby the resistor functions as a current sensing resistor for motor current. Since the level of current drawn by motor 182 is related to variations in the speed of the motor which result from variations in the load placed on the motor, the sensed current is thereby an indicator of variations in load demands being placed on the motor.

When motor 182 is operating and is unloaded, the level of current flowing through resistor 176 develops a voltage drop across the resistor which is divided by potentiometer 192 and applied to the input of device 194. Potentiometer 193 has been set previously, for example, at the factory so that the threshold voltage of device 194 is at a level slightly above a voltage level which is representative of the motor current level when motor 182 is unloaded.

When the input to device 194 is below the threshold voltage, which is the condition when motor 182 is unloaded, the output of the device is active to connect resistors 196 and 198 in series. This prevents any current flow at the gate of SCR 202 whereby the SCR is not conducting. When SCR 202 is not conducting, there is no current flow through resistor 206 and, thereby, no voltage differential between the gate and the cathode of SCR 210. Thus, SCR 210 is not conducting to preclude the discharge of capacitor 190 during periods when motor 182 is unloaded.

As motor 182 is loaded, the current drawn by the motor increases whereby the voltage drop across resistor 176 increases. The voltage input to device 194 now exceeds the threshold voltage level of the device whereby the output of the device "floats" to a voltage limited only by Zener diode 208 and the forward voltage drop on the gate of SCR 202. Under this condition, current will flow from the positive side of capacitor 190 through resistor 198, Zener diode 208 and into the gate of SCR 202 whereby the SCR turns on. When SCR 202 is turned on, current is supplied through resistor 204 to the gate of SCR 210 to turn on SCR 210. Capacitor 190 is now connected through SCR 210, to motor 182 to provide a boost of power during periods when the motor is loaded.

When the load on motor 182 is removed, the above-described sequence is reversed thereby removing the power boost facility whereby the motor returns to the unloaded speed.

It is noted that circuit 160 is similar to circuit 84 (FIG. 1). For example, both circuits 84 and 160 include a rectifier for developing a pulsating D.C. voltage which is applied to a motor and, through a diode, to a capacitor to charge the capacitor. Also both circuits 84 and 160 include an SCR which is controlled through a sensing circuit responsive to the loaded condition of the motor. With respect to circuit 84, the sensing circuit is responsive to variations in the CEMF of the motor while the sensing circuit of circuit 160 is responsive to variations in current through the motor. In any event, circuits 84 and 160 each respond to load conditions of the respective motors to supply a boost of power from the capacitor by filtering the pulsating D.C. voltage and thereby increasing the effective average D.C. voltage applied to the motor.

As noted above, power boost circuit 84 provides a means which is responsive to a decrease in the speed of motor 106 for supplying a boost of power to the motor. Still, there is a need for a facility to insure that the motor does not go into an overspeed mode whereby the motor sped would progressively increase beyond a safe limit of operation.

Figure 5:
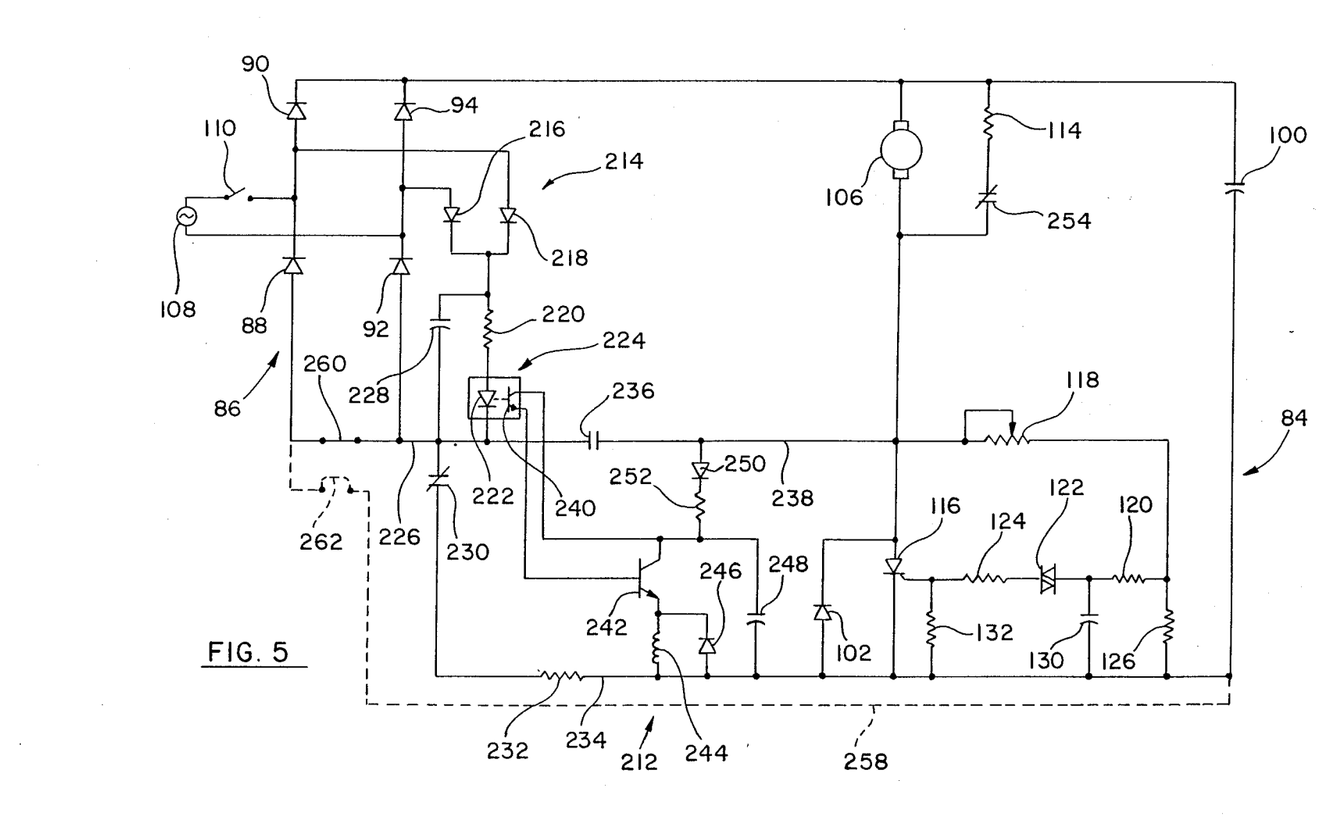
FIG. 5 is a schematic of a circuit which includes the power boost features of the circuit of FIG. 1 and which further includes an overspeed responsive facility for stopping the motor of a power-operated device using the circuit in accordance with certain principles of the invention.

Such a facility is illustrated in FIG. 5 as overspeed and brake control circuit 212 which is connected within power boost circuit 84 between rectifier 86 and the remainder of the power boost circuit. Power boost circuit 84 is illustrated in FIG. 5 in a circuit arrangement which is different from the arrangement illustrated in FIG. 1 to show an alternate manner of connecting the circuit. It is noted that circuit 84 will function in the same manner regardless of whether the circuit is connected as shown in FIG. 1 or as shown in FIG. 5. Also, the various components of circuit 84 as shown in FIG. 5 have been identified with the same numerals as in FIG. 1. Therefore, the function and operation of these components will not be described further except where such components relate to the operation of overspeed and brake control circuit 212.

Referring further to FIG. 5, overspeed and brake control circuit 212 includes a full wave rectifier 214 which is formed by diodes 88, 92, 216 and 218. It is noted that rectifier 214 operates independently of rectifier 86 for reasons to be explained hereinafter. Rectifier 214 is connected to A.C. power source 108 through switch 110. The output of rectifier 214 is connected to a resistor 220 which, in turn, is connected to the anode of a light-emitting diode 222 of an opto-isolator 224 which functions as a light-activated switch. The cathode of diode 222 is connected to a common line 226. The anodes of diodes 88 and 92 are also connected to line 226. A filter capacitor 228 is connected in parallel with resistor 220 and diode 222 to filter and smooth the pulsating D.C. output of rectifier 214. Line 226 is also connectable through a normally closed relay contact 230 and a resistor 232 to a line 234 and through a normally open relay contact 236 to a line 238.

Opto-isolator 224 also includes a light-sensitive silicon switch 240 which is connected across the base-collector circuit of a transistor 242. A relay coil 244 is connected between the emitter of transistor 242 and line 234 and is connected in parallel with a diode 246. A capacitor 248 is connected between the collector of transistor 242 and line 234. A diode 250 and a resistor 252 are connected in series between line 238 and the collector of transistor 242. A normally closed relay contact 254 is connected in series with brake resistor 114 and replaces switch 112 (FIG. 1).

Referring again to FIG. 5, when the operator closes switch 110, the output of rectifier 86 is connected across capacitor 100 by virtue of normally closed relay contact 230. In addition, the output of rectifier 86 is connected to supply current to a series circuit which includes resistor 114, normally closed relay contact 254, rheostat 118 and resistor 126. In this circuit configuration, series-connected rheostat 118 and resistor 126 are connected in parallel with a series circuit which includes diode 250, resistor 252, the emitter and collector of transistor 242 and relay coil 244. This results in the biasing of transistor 242 into conduction whereby relay coil 244 is energized. Upon energization of relay coil 244, contacts 230 and 254 will open and contact 236 will close whereby power boost circuit 84 begins to function, as previously described with respect to FIG. 1.

In this configuration, SCR 116 is not conducting and a voltage therefore appears between the anode and cathode of the SCR. This voltage is applied across the series circuit Which includes the emitter and collector of transistor 242 to sustain current flow therethrough and to keep relay coil 244 in the energized state. Also, capacitor 248 will charge quickly to a voltage level determined by the level of voltage appearing across non-conducting SCR 116.

Assume that during normal operation of the power-operated device which includes circuits 84 and 212, motor 106 experiences a load condition whereby a boost of power is needed from capacitor 100. At this time, SCR 116 fires as described above and the voltage across the SCR drops to near zero. This results in the removal of the primary source of voltage for sustaining current flow through relay coil 244 and the emitter and collector of transistor 242. However, capacitor 248 has charged sufficiently to function as a secondary power source and thereby provides the necessary current through relay coil 244 and the emitter and collector of transistor 242 to maintain the relay coil in the energized state. Eventually, the need for a power boost passes and SCR 116 is turned off. Since capacitor 100 has discharged slightly, diode 102 will conduct for a brief period to recharge the capacitor to peak value of the pulsating D.C. input. During the period when diode 102 is conducting, SCR 116 is effectively shorted so that no voltage appears across the non-conducting SCR whereby capacitor 248 continues to supply current to sustain the energization of relay coil 244. After capacitor 100 has been recharged, diode 102 ceases to conduct and the primary source of voltage for relay coil 244, i.e. the voltage across SCR 116, maintains current flow through the relay coil in the manner described above.

Figure 6:
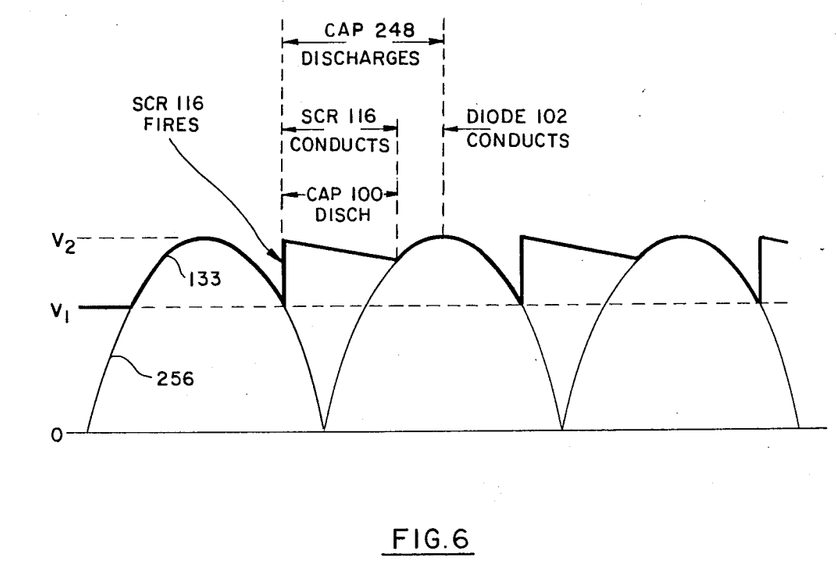
FIG. 6 is a waveform diagram illustrating the voltage applied to the motor of the power-operated device using the circuits of FIGS. 1 and 5.

This pattern of circuit operation can be observed through analysis of the waveforms of FIG. 6. As illustrated, a pulsating D.C. voltage waveform 256 represents the output of rectifier 86 (FIG. 5). Voltage level V1 represents the CEMF of motor 106 where the motor is a permanent magnet motor. Voltage level V2 represents the peak level of the pulsating D.C. voltage. The heavy-lined voltage waveform 133 which generally follows the peaks of the pulsating D.C. voltage represents the voltage applied to motor 106 as noted above with respect to circuit 84 as illustrated in FIG. 1. As long as the CEMF of motor 106 is greater than the line voltage appearing at the output of rectifier 86, diodes 90 and 94 will be reverse biased and will not conduct. This condition is represented by the lighter line which follows the pulsating waveform 256. As soon as the line voltage equals the CEMF of motor 106 as represented by voltage V1, diodes 90 and 94 will conduct and the voltage applied to the motor follows the heavier line as illustrated by waveform 133. The voltage applied to motor 106 follows the line voltage to peak voltage V2 and then slopes downwardly toward the level of voltage V1.

Eventually, the voltage applied to motor 106 drops to the level of voltage V1 whereby SCR 116 fires whereby capacitor 100 discharges to quickly apply the voltage of the capacitor to the motor. Now that SCR 116 is conducting, capacitor 248 will discharge to sustain current flow through relay coil 244. Since capacitor 100 has been charged to peak value of the rectified line voltage, when SCR 116 fires, the voltage applied to motor 106 rises quickly to peak level and then gradually declines as the capacitor discharges until the declining voltage level intersects the pulsating D.C. voltage level. At this time, SCR 116 is biased off and capacitor 100 ceases discharging. Thereafter, diode 102 conducts to recharge capacitor 100 to peak value of the pulsating D.C. voltage. At peak value of the pulsating line voltage, capacitor 100 is fully charged and, therefore, diode 102 ceases to conduct. The voltage applied to motor 106 then follows the pulsating line voltage until the voltage level equals the CEMF of the motor, i.e., voltage V1, where SCR 116 again fires and the pattern is repeated as described above.

During the period when SCR 116 or diode 102 is conducting, capacitor 248 is discharging as represented in FIG. 6 to provide the necessary current to sustain energization of relay coil 244.

This pattern continues as long as the power-operated device is functioning normally. However, if diac 122, SCR 116 or diode 102 becomes defective and shorts, the primary source of voltage provided across SCR 116 disappears permanently and capacitor 248 discharges fully whereby relay coil 244 is de-energized. Contact 254 then closes to connect motor 106 in series with brake resistor 114 to stop the motor quickly. Also, contact 230 closes and contact 236 opens. In this manner, circuit 212 prevents motor 106 from going into an overspeed mode and controls the rapid braking of the motor to prevent any damage to any portions of the power-operated device and the surrounding environment.

While the foregoing description relates to the use of overspeed and brake control circuit 212 (FIG. 5) with power boost circuit 84, circuit 212 can be used in the same manner with power boost circuit 160 (FIG. 4) without departing from the spirit and scope of the invention.

The foregoing description of the combined circuits 84 and 212, as illustrated in FIG. 5, relates to the use of rectifier 86 as a full wave rectifier. If desired, the necessary rectification could be accomplished by use of a half-wave rectifier. If so, an additional line 258, shown as a dashed line, can be added. A strap 260 in full-wave line 226 would be removed if half-wave rectification is to be used. A strap 262 is included in half-wave line 258 to facilitate disconnecting of the line when the full-wave operation is to be selected.

As illustrated in FIG 1, motor-braking switch 112 is mechanically linked to on-off switch 110 so that when switch 110 is opened, switch 112 is closed to connect brake resistor 114 immediately to motor 106 to brake the motor. As illustrated in FIG. 5, switch 112 has been replaced by relay contact 254. Thus, there is no mechanical link to on-off switch 110. However, when switch 110 is opened, A.C. source 108 is disconnected from rectifier 214, as well as rectifier 86, and relay coil 244 is thereby de-energized which facilitates closure of contact 254 to brake motor 106.

During periods when overspeed and brake control circuit 212 is operating, it is imperative that the circuit be immediately responsive to the disconnecting of A.C. source 108 from the circuit, for example, by the opening of switch 110. As noted above, diodes 90 and 94 of rectifier 86 are reverse biased during periods when the CEMF of motor 106 is greater than the pulsating D.C. output of the rectifier. If during these reverse-biased periods, the A.C. source 108 is disconnected from power boost circuit 84, such disconnection would not be detectable at the output of rectifier 86. Therefore, in order for circuit 212 to be directly responsive to the disconnection of A.C. source 108, and not to be influenced by the CEMF of motor 106, rectifier 214 is connected through switch 110 directly to the A.C. source. In this manner, coil 244 can be controlled directly in response to changes in the line voltage as provided by A.C. source 108.

In the use of motors which employ a field coil, it is common practice at the time of braking the motor to reverse the connection of the field coil with the armature to provide a dynamic braking effect. In order to attain this braking effect, the unpowered armature must be rotating through a magnetic field after the operating voltage has been removed from the motor. Also, a switching arrangement is usually employed whereby the power to the motor is removed initially and then the dynamic braking action is applied. This insures that operating power has been completely disconnected from the motor before any effort is made to stop rotation of the armature.

One example of the dynamic braking principle is illustrated as prior art in U.S. Pat. No. 4,144,482 which issued on Mar. 13, 1979. In this example, an A.C. line voltage from an A.C. source is applied to a series-connected field coil and armature to operate the associated motor. During this operation, the line voltage waveform crosses the zero value level at a rate which is twice the operating frequency of the A.C. source. As the waveform passes through the zero value level, there is no current flow through the field coil to sustain the magnetic field whereby the developed field dissipates. However, there is residual magnetism remaining in the core of the field core. This residual magnetism is sufficient to maintain a low level flux in the same direction and through which the armature is rotating.

As the voltage waveform moves away from the zero value level, current begins to flow through the coil in the opposite direction to develop a field within the core with flux in the opposite direction. The developing field counters and effectively cancels the field resulting from the residual magnetism of the core whereby the field through which the armature is rotating passes through a zero flux level. At this time, the flux reverses direction and begins to rebuild in the opposite polarity.

As noted above, when power is removed from the armature and an effort is made to apply a dynamic braking action to stop the armature, the armature must be rotating, by coasting, through a magnetic field. If the power is removed from the motor at the instant that the A.C. voltage crosses the zero value level, the residual magnetism within the core is sufficient to develop a field which will permit dynamic braking to occur. However, if the power is removed from the motor at the instant of zero flux, there is no sustained field sufficient to effect the dynamic braking and the braking action fails.

This is a distinct disadvantage when dynamic braking is used in motor systems which are powered directly from an A.C. source.

Figure 7:
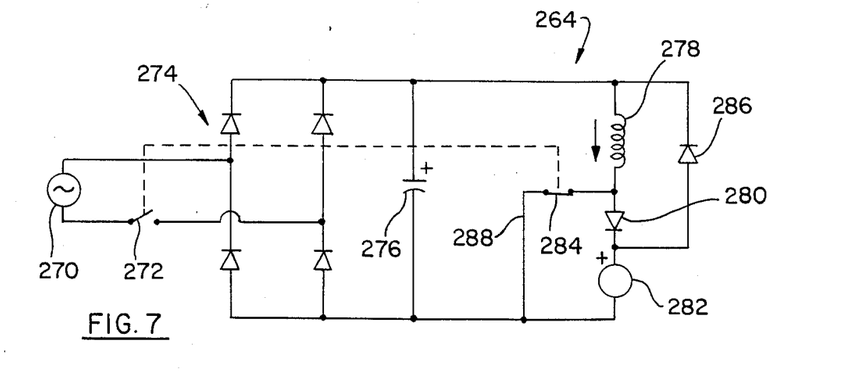
FIGS. 7, 8 and 9 are schematics showing techniques for applying dynamic braking to stop the motor of a power-operated device in accordance with certain principles of the invention.
Figure 8:
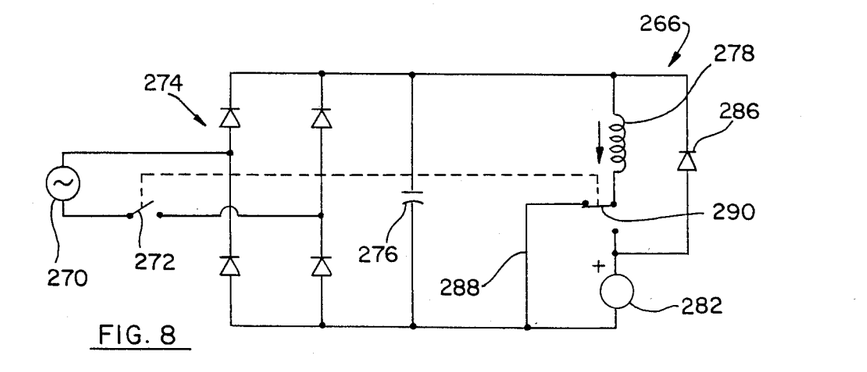
Figure 9:
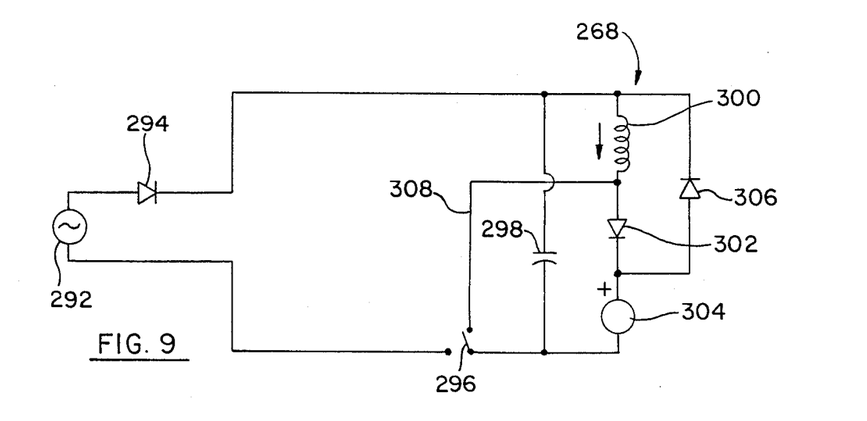

To compensate for the zero flux effect noted above, braking circuits 264, 266 and 268, as illustrated in FIGS. 7, 8 and 9, respectively, have been designed to facilitate the application of dynamic braking in a manner which embodies certain principles of the invention. Generally, each of the circuits 264, 266 and 268 illustrate a dynamic braking system wherein the motor is powered by a D.C. voltage. The D.C. voltage can be filtered by a smoothing capacitor, or can be pulsating rather than filtered. With the application of D.C. voltage, the zero flux problem encountered when using an A.C. voltage to power the motor is eliminated.

In other respects, and in accordance with certain principles of the invention, circuits 264, 266 and 268 illustrate unique circuit structure for reverse-connecting the field coil and the armature to effect the dynamic braking of a motor.

Referring to FIG. 7, an A.C. source 270 is connected through a switch 272 to a full wave rectifier 274. The output of rectifier 274 is connected across a filter capacitor 276 which facilitates the application of filtered D.C. to a series leg including a field coil 278, a diode 280 and an armature 282 where the field coil and armature form a universal motor. When switch 272 is closed, the voltage appearing across capacitor 276, and applied across coil 278, diode 280 and armature 282, is an essentially flat D.C. voltage with a minimum ripple, especially during an idle condition. During this period, current flows through field coil 278, diode 280 and armature 282 to operate the universal motor in a conventional manner whereby the armature is generating a CEMF.

Braking circuit 264 includes armature 282, a switch 284, a diode 286, field coil 278 and line 288 all of which are connected in a series loop during dynamic braking of the armature. Switch 284 is mechanically linked to switch 272 so that switch 284 is open when switch 272 is closed and vice-versa. A braking resistor (not shown) may be connected optionally in series in line 288.

When switch 272 is opened, switch 284 is closed. The CEMF, or generated voltage, of armature 282 then forces current to flow from the positive side of the armature, through diode 286, field coil 278, switch 284, line 288 and returns to the other side of the armature. In this manner a retarding torque is developed to stop the armature quickly. As noted above, the optional braking resistor can be added in line 288 to control the braking time for a softer stop.

Brake circuit 266 illustrated in FIG. 8 differs from brake circuit 264 shown in FIG. 7 by the removal of diode 280 (FIG. 7) and the insertion of a switch 290 in place thereof. Actually, switch 290 is a single-pole, double-throw switch which is mechanically linked to switch 272. When switch 272 is closed, switch 290 is positioned to connect field coil 278 to the positive side of armature 282 and thereby functions in the manner of diode 280 (FIG. 7) during operation of the universal motor. When switch 272 is opened, switch 290 is positioned to connect field coil 278 to line 288 in the manner of switch 284 (FIG. 7) during the dynamic braking mode. Again, a braking resistor may be added optionally in line 288.

While the circuits 264 and 266 of FIGS. 7 and 8, respectively, provide full-wave rectification, brake circuit 268 illustrated in FIG. 9 provides half-wave rectification. In FIG. 9, an A.C. source 292 is coupled through a single diode 294 and a single-pole, double-throw switch 296 in one position to a filter capacitor 298 to apply filtered D.C. to a series leg which includes a field coil 300, a diode 302 and an armature 304 to operate the universal motor. When switch 296 is moved to the other position, a series loop is formed which includes armature 304, a diode 306, field coil 300, a line 308 and switch 296. A.C. source 292 and diode 294 are effectively disconnected from filter capacitor 298. Brake circuit 268 is now connected to function in the same manner as brake circuits 264 (FIG. 7) and 266 (FIG. 8). This provides dynamic braking by directing current from the positive side of armature 304 through diode 306, field coil 300, line 308, switch 296 and to the other side of the armature. Again, a braking resistor may be added in line 308 if desired.

Thus, by operating universal motors from D.C. voltage, filtered or unfiltered, the zero-flux problem experienced when operating the motor directly from an A.C. source is essentially eliminated. This provides consistent braking upon demand which is highly reliable. In addition, each of the circuits 264, 266 and 268, as shown in FIGS. 7, 8 and 9, respectively, provide circuit structure which is readily blended with the power boost circuits of FIGS. 1, 4 and 5 to provide enhanced dynamic braking for these circuits.

In summary, systems embodying the principles of this invention include the power boost capability of power boost circuit 84 (FIG. 1). When motor 10 (FIG 1) experiences load conditions, additional power is automatically and immediately coupled to the motor from a source, i.e. capacitor 100, other than the conventional input power source 108. This permits motor 106 to operate as a small motor drawing a relatively small amount of current during no-load or light load conditions but act as a large motor drawing increased current when significant load demands are placed on the motor. Comparatively, power-operated devices using circuit 84 also provide increased power output coupled with sustained speed during load conditions.

Power boost circuit 160 (FIG. 4) also embodies the principles of this invention and provides the power boost advantages in the same manner as circuit 84 (FIG. 1). Circuit 160 can be used with several different types of motors such as, for example, PM motors, universal motors, shunt motors and compound motors.

Further, overspeed and brake control circuit 212 (FIG. 5) provides an element of protective control of operation which is embodied within the principles of this invention. Circuit 212, in combination with power boost circuit 84, or power boost circuit 160, facilitates power boost in an environment which assures the user that unexpected failure of key elements of the power boost circuit is not going to damage the device.

Finally, when using universal motors in conjunction with any of the power and control circuits 84 and 212, the dynamic braking circuits 264, 266 and 268, which are also embodied in the principles of the invention, provide facility for quickly and smoothly braking the motor associated with each of such power and control circuits. By use of circuits 264, 266 and 268, in conjunction with an input of filtered D.C. voltage for motor operation, any concern for failure of a braking operation resulting from the zero flux problem is eliminated.

Thus, the features of power enhancement, power boost, overspeed and brake control and dynamic braking, each provide an independent element of this invention which stands alone and apart from the other features without departing from the spirit and scope of the invention. Further, these features are combinable in a variety of ways as illustrated in the drawings and as described above also without departing from the spirit and scope of the invention.

What is claimed is:

1. A power system for a motor, which comprises:
rectifier connected directly for continuously supplying power from a power source to a motor;
reactive means connected to derive its energy from the power source and responsive to a demand from the motor for supplying additional power to the motor simultaneously with the supply of power to the motor by the rectifier, and
means for maintaining the reactive means in a disconnected state from the motor unless and until the motor demands additional power.

2. A power system for a motor, which comprises:
rectifier connected directly for continuously supplying power from a power source to a motor;
reactive means connected to a derive its energy from the power source for supplying power to the motor;
means for sensing that the motor requires power in addition to the power supplied by the rectifier;
means responsive to the sensing means for supplying power from the reactive meansto the motor at least during a period when the rectifier is supplying power to the motor, and
means for maintaining the reactive means in a disconnected state from the motor unless and until the motor demands additional power.

3. The power system as set forth in claim 2, which further comprises means for developing the power of the reactive means from the power source.

4. A power system for a motor, which comprises:
rectifier connected directly for continuously supplying power from a power source to a motor;

reactive means connected to derive its energy from the power source for supplying power to the motor;

means for sensing the condition of the motor to determine when additional power is required by the motor;

means for connecting the reactive means to the sensing means to power at least a portion of the sensing means during periods when the sensing means is operational;

means responsive to the sensing means determining that the motor requires additional power for connecting the reactive means directly across the motor to supply the additional power, and means for maintaining he reactive means in a disconnected state from the motor unless and until the motor demands additional power.

5. A power system for a motor, which comprises:
rectifier connected directly for continuously supplying power from a power source to a motor;
reactive means connected to derive its energy from the power source for supplying power to the motor;
means for detecting a change in a load-related parameter associated with the operation of the motor as an indication of a demand from the motor for a boost of power;
means responsive to a detected change in the parameter for supplying power from the reactive means to the motor, and
means for maintaining the reactive means in a disconnected state from the motor unless and until the motor demands additional power.

6. The power system as set forth in claim 5, wherein the load-related parameter is a counter electromotive force (CEMF) developed by the motor and a decrease in the CEMF is the indication of the demand for a boost of power to the motor.

7. The power system as set forth in claim 5, wherein the load-related parameter is the current flow through the motor and an increase in the current level through the motor is the indication of the demand for a boost of power to the motor.

8. The power system as set forth in claim 5, wherein the load-related parameter is the speed of the motor and a decrease in the speed is the indication of the demand for a boost of power to the motor.

9. The power system as set forth in claim 5 wherein the motor is a permanent magnet motor.

10. The power system as set forth in claim 5 wherein the motor is a universal motor which includes a field coil and an armature connected in series.

11. A power system for a motor, which Comprises:
rectifier connected directly for supplying power continuously from a power source to a motor;
reactive means connected to derive its energy from the power source for boosting the power applied to the motor from the rectifier;
means responsive to a demand from the motor for selectively operating the reactive means to supply boosted power to the motor, and
means for maintaining the reactive means in a disconnected state from the motor unless and until the motor demands the boosted power.

12. The power system as set forth in claim 11 wherein the power provided by the rectifier is a pulsating D.C. voltage which develops an average D.C. voltage applied to the motor and the reactive means is a capacitor which smooths ripples of the pulsating D.C. voltage to increase the effective D.C. voltage level applied to the motor.

13. A power system for a motor, which comprises:
a primary source of D.C. power;
rectifier connected directly for applying power from the primary source to a motor;
a secondary reactive source of D.C. power connected to derive its energy from the primary source;
means for sensing an operating condition of the motor which is indicative of a demand from the motor for a boost of power;
means for connecting the motor and the secondary reactive source of D.C. power in a series loop;
means responsive to a sensed demand from the motor for operating the connecting means to connect the motor and the secondary reactive source of D.C. power in the series loop to thereby provide additional power to the motor at least during a period when power from the primary source is being applied to the motor, and
means for maintaining the secondary reactive source in a disconnected state from the motor unless and until the motor demands additional power.

14. The power system as set forth in claim 13, wherein the connecting means is a silicon-controlled rectifier.

15. The power system as set forth in claim 13, wherein the operating means is a bipolar device which conducts current after the voltage appearing thereacross reaches a prescribed level.

16. A method of supplying power to a motor, which comprises the steps of:
supplying power continuously to a motor connected directly from a rectifier to operate the motor;
monitoring the speed of the motor as a representation of a need for additional power;
supplying additional power, from an additional source which is a reactive source deriving its energy from the rectifier, to the motor in response to a detected need therefor through the monitoring of the speed of the motor, and
maintaining the additional source in a disconnected state from the motor unless and until the additional power is supplied to the motor in response to the detected need.

17. The method as set forth in claim 16, wherein the step of monitoring the speed of the motor includes the steps of:
monitoring the current flow through the motor; and
detecting an increase in the current level flow through the motor representative of a decrease in speed in the motor.

18. A method as set forth in claim 16 further comprising the steps of:
monitoring the count electromotive force (CMF) of the motor representative of a decrease in speed of the motor;
detecting a decrease in the CEMF of the motor representative of a decrease in speed of the motor.

19. A power system for supplying power to a load, which comprises:
rectifier connected directly for continuously supplying power from a power source to the load;
reactive means connected to derive its energy from the power source and responsive to a demand from the load for supplying additional power to the load simultaneously with the supply of power to the load by the rectifier, and means for maintaining the reactive means in a disconnected state from the load unless and until the load demands additional power.

20. A power system for supplying power to a load, which comprises:

rectifier connected directly for supplying power from a power source to the load;

reactive means connected to derive its energy from the power source for supplying power to the load;

means for sensing that the load requires power in addition to the power supplied by the rectifier;

means responsive to the sensing means for supplying power from the reactive means to the load at least during a period when the rectifier is supplying power to the load, and means for maintaining the reactive means in a disconnected state from the load unless and until the load demands additional power.

21. A power-operated device, which comprises:

a drivable element;

a motor coupled to the drivable element for driving the element;

a power source;

rectifier connected directly for applying power from the power source to the motor;

a secondary source of D.C. power which is a reactive source deriving its energy from the power source;

means for sensing an operating condition of the motor which is indicative of a demand from the motor for a boost of power;

means for connecting the motor and the secondary source of D.C. power in a series loop;

means responsive to the sensed demand from the motor for operating the connecting means to connect the motor and the secondary source of D.C. power in the series loop to thereby provide additional power to the motor at least during a period when power from the power source is being applied to the motor, and means for maintaining the secondary source in a disconnected state from the motor unless and until the motor demands additional power.

22. The power-operated device as set forth in claim 21, wherein the power-operated device is a lawn mower.

23. The power-operated device as set forth in claim 22, which further comprises means for dynamically braking the motor by reverse connecting the field coil and the armature of the motor in a closed series loop.

24. A power system for a motor, which comprises:

a power source;

rectifier connected directly for applying power from the power source to a motor for providing a pulsating D.C. voltage to the motor;

a secondary source of D.C. power which includes means for filtering the pulsating D.C. voltage to effectively develop an enhanced voltage of higher average level than the pulsating D.C voltage;

means for sensing an operating condition of the motor which is indicative of a demand from the motor for a boost of power;

means for connecting the motor and the secondary source of D.C. power in a series loop; and means responsive to the sensed demand from the motor for operating the connecting means to connect the motor and the secondary source of D.C. power in the series loop to thereby provide additional power to the motor at least during a period when power from the power source is being applied to the motor.

25. The power system as set forth in claim 24 wherein the secondary source includes a capacitor and the power system further comprises means for charging the capacitor from the rectifier.

26. The power system as set forth in claim 25, further comprises means for maintaining the charge on the capacitor until the connecting means has been operated.

27. The power system as set forth in claim 24 further comprises means for braking the motor after the application of power from the power source has been removed from the motor.

* * * * *